United States Patent Office 3,250,124
Patented May 10, 1966

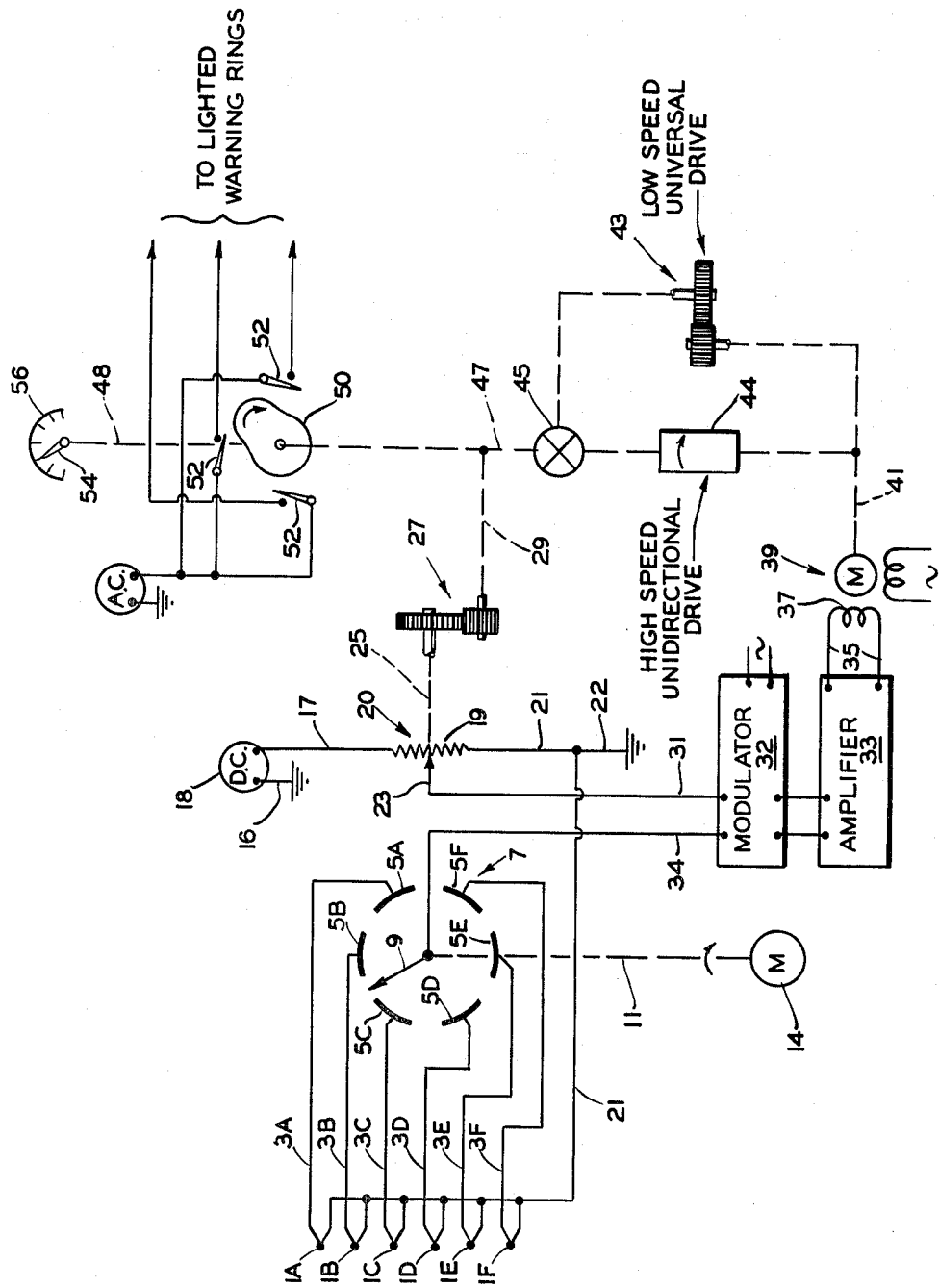

3,250,124
METHOD AND SYSTEM FOR COMPUTING AND/
OR INDICATING MAXIMUM SIGNAL INPUT
Frederick Blancke Sylvander, Rutherford, N.J., assignor to The Bendix Corporation, Teterboro, N.J., a corporation of Delaware
Filed Mar. 20, 1963, Ser. No. 266,585
6 Claims. (Cl. 73—341)

This invention relates to a method and system for computing and/or indicating maximum signal input and more particularly to a method and system for effecting the foregoing including a commutating device for sequentially sampling several input voltages; a servoed potentiometer follow-up system with a relatively low speed high gear ratio drive and in parallel with this low speed drive, there is provided a high speed drive capable of transmitting motion in one direction of rotation only (for example, a ratchet or other suitable means to accomplish such function) whereby a servo follow-up system is provided with a faster response to upscale movement than to downscale movement.

An object of the invention is to obtain and/or indicate physically a quantity proportional to the highest one of several input voltages or currents.

Another object of the invention is to provide an apparatus to effect the foregoing and particularly applicable to the field of thermocouple temperature indicating systems, specifically as a means of indicating "hot-spot" temperature.

A conventional method to effect the foregoing has been to use diode "OR" circuits. In the case of lower voltages in the neighborhood of 0.5 volt, the diode circuit method has been found to be impractical in that in such method it becomes necessary to amplify the voltages to a 50 volt level for accuracy, and, in the process of modulation, amplification and demodulation, there would be great complexity required to maintain this accuracy.

Another object of the invention, therefore, is to provide novel means for accomplishing such "OR" function electromechanically.

Another object of the invention is to provide novel means for effecting the foregoing in which various condition sensors are selectively connected in sequence by a commutator together with means whereby the output from the commutator may be introduced into a potentiometer follow-up servo system in which for adjustment in one sense, the response is very fast compared to a relatively slow adjustment in an opposite sense.

Another object of the invention is to provide novel means whereby in the aforenoted servo system, the movement in said one or upscale sense may be transmitted through a unidirectional device at a high speed ratio while movement in an opposite or downscale sense may be effected only at a low speed ratio so that a high or increased sensed temperature condition at any one of the commutator segments will send the indication rapidly upscale while a low or decrease in the sensed temperature condition may be effected only after several rotations of the commutator shows no high temperature sensed condition.

Another object of the invention is to provide a multiple condition sensing method or apparatus in which there is a faster response to conditions acting in an excessive sense than to sensed conditions acting in an opposite sense.

These and other objects and features of the invention are pointed out in the following description in terms of the embodiment thereof which is shown in the accompanying drawing. It is to be understood, however, that the drawing is for the purpose of illustration only and is not a definition of the limits of the invention. Reference is, therefore, to be had to the appended claims for this purpose.

The drawing is a schematic illustration of an electromechanical device embodying the invention.

Referring to the drawing, there is indicated by the numerals 1A, 1B, 1C, 1D, 1E, and 1F multiple condition sensing devices or thermocouples, for example, to sense temperature conditions at various points on surfaces of an aircraft or re-entry vehicle, or for example, at different points in a combustion chamber of an aircraft engine. Electrical leads 3A, 3B, 3C, 3D, 3E, and 3F lead from one terminal of the respective condition sensors to corresponding segments 5A, 5B, 5C, 5D, 5E, and 5F of a commutating device indicated generally by the numeral 7 and having a rotatable arm 9 cooperating with the respective switch segments 5A–5F to selectively close the same. The arm 9 may be driven through the shaft 11 by a suitable constant speed motor indicated generally by the numeral 14.

A conductor 17 leads from a regulated source of D.C. current 18 to one end of a variable resistor 19 of a potentiometer 20. The opposite terminal of the source 18 is grounded at 16 while the opposite end of resistor 19 is connected by a conductor 21 grounded at 22. The conductor 21 also leads to an opposite terminal of the multiple condition sensing devices or thermocouples 1A–1F. A potentiometer arm 23 cooperates with the variable resistor 19 and is adjustably positioned with respect thereto by a shaft 25 driven through gearing 27 and shaft 29 to effect a follow-up action by suitable adjustment of the arm 23 relative to the variable resistor 19 of the potentiometer 20, as hereinafter explained.

The adjustable potentiometer arm 23 is electrically connected through a conductor 31 to an input terminal of an A.C. modulator 32 having output connections leading to the input of an amplifier 33. An opposite input terminal of the modulator 32 is connected through a conductor 34 leading to the adjustable arm 9 of the commutator device 7.

The arrangement is such that the commutating device 7 serves to sequentially sample the several D.C. input voltages provided by the condition sensing or thermocouple devices 1A through 1F to provide an input voltage through the line 21, potentiometer 20, arm 23, and conductor 31 to the input of the modulator 32 while the opposite input terminal of the modulator 32 is connected by conductor 34 through the arm 9 of the commutator device 7 to the terminal of the condition sensing device 1A through 1F selected by the position of the commutator arm 9 with respect to the commutator segments 5A–5F.

The electrical D.C. signal thus applied across the input of the A.C. modulator 32 and thereby to the amplifier 33 affects an A.C. control signal across the output lines 35 of the amplifier applied to the control winding 37 of a servo motor 39 which may be of a conventional two-phase reversible type. The A.C. control signal acts in a sense to cause the motor 39 to drive an output shaft 41 in one direction or the other depending upon whether the sensed condition such as temperature is acting in an increasing or decreasing sense.

The shaft 41 is drivingly connected through a low speed gear ratio drive 43 and a parallel connected high speed drive 44 to a suitable coupling device 45 and thereby to an output shaft 47. The parallel connected high speed drive 44 is of a type capable of transmitting motion, in one direction of rotation only at a relatively high speed (for example, a ratchet or other suitable unidirection high speed drive may be utilized to accomplish this function).

In the temperature sensing device shown in the drawing, the unidirectional drive 44 may be arranged to drive the coupling 45 at a relatively high speed in an upscale direction while rotation in a downscale direction is effected through the low speed drive 43.

The output shaft 47 from the coupling 45 is drivingly connected through the shaft 29 and gearing 27 to the potentiometer arm 23 and is further drivingly connected to a cam 50 to sequentially operate suitable switches 52 for controlling the energization of suitable warning ring lights. The shaft 47 is further connected through a shaft 48 to a temperature condition indicator pointer 54 cooperating with suitable indicia 56.

An adjustment of the potentiometer arm 23 in a relatively rapid upscale sense and relatively slow downscale sense effects an electrical D.C. follow-up signal applied through conductors 21 and 31 and acting in opposition to the electrical D.C. signal applied by the thermocouple 1A–1F selected by the commutator 7 and acting in a sense tending to wipe out the error signal resulting upon either an increase or decrease in the signal applied by the thermocouple or temperature condition sensing device selected by the commutating device 7.

*Operation*

From the foregoing, it will be seen that there has been provided a commutating device 7 for sequentially sampling the several input voltages effected by the condition sensing devices 1A–1F. There is further provided a servo potentiometer 19–23 follow-up system with parallel connected relatively high and low speed drives. Thus, there is provided a relatively high speed drive 44 capable of transmitting motion to follow-up potentiometer 20 in one direction of rotation only and acting in an upscale driving relation and a low speed drive 43 effective to drive the follow-up potentiometer 20 in the downscale direction as well as in the upscale direction.

Further, the commutator 7 selects each input voltage from the condition sensing device 1A–1F in sequence, dwelling an equal length of time on each. Each time a higher reading that the previous maximum is encountered, the servo system acts to rapidly turn the drive shaft 41–47 in a direction to position the indicator 54 to the high temperature reading position relative to the indicia 56 because of the high speed adjustment effected by the drive 44 in the upscale direction.

The high speed adjustment of the shaft 47 in the upscale sense will also be imparted to the potentiometer arm 23 through the drive shaft 29, gearing 27, and drive shaft 25 so as to effect a desired rapid follow-up action.

In the aforenoted arrangement, it will be further seen that downscale movement is effected only at a relatively slow speed because of the high gear ratio of the drive 43 for effecting the downscale adjustment while the ratchet or unidirectional drive 44 is not effective to impart an adjustment in a downscale sense. It may be noted that upscale movement must also be transmitted through the high gear ratio drive 43 but that most of the upscale movement is imparted through the high speed ratio drive 44 through the ratchet or unidirectional operating means.

Thus, after passing a maximum data input sensed condition, the commutator 7 in coming to the next switch sector which inserts an input of a lower sensed temperature value, tends to cause the indicator reading effected by the pointer 54 to start to decrease but at such a slow rate that the decrease is negligible in the interval between occurrences of the sensed high temperature value. The speed of rotation of the commutator arm 9 by the motor 14 and the number of inputs are so interrelated that the dwell time on each input switch section 5A–5F should be sufficiently long for a fullscale upward indication to take place. However, the fastest commutation speed consistent with the above requirement should be used in order that the high gear ratio of the drive 43 required in the downscale or low speed sense need not be too high. This compromise will lessen the decay time from one maximum reading to a new maximum which is lower. This minimum decay time will be several complete commutation cycles.

Furthermore, in the aforenoted arrangement, the servo follow-up system effected by the potentiometer 19–23 has a faster response to a condition acting in one sense such as upscale movement than to a condition acting in an opposite sense such as a downscale movement. Further, there may be obtained and/or indicated physically a quantity proportional to the highest one of the several input voltages or currents, and the method or apparatus herein provided may be useful in the case of very low A.C. or D.C. inputs and thus will be highly applicable to the field of thermocouple indicating systems, specifically as a means of indicating "hot-spot" temperature.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. Condition sensing means comprising a plurality of condition sensing devices, a commutator for selectively rendering the condition sensing devices effective, a control system including said commutator and a follow-up device operatively connected therein, a reversible motor operatively controlled by said control system, a high speed drive and a low speed drive operatively connected in parallel and driven by said motor, said high speed drive and said low speed drive having a common output shaft operatively connected to the follow-up device, the high speed drive including means capable of transmitting motion from the motor in one direction of operation only, and the low speed drive being capable of transmitting motion in an opposite direction whereby a change in the sensed condition in one sense may cause said motor to effect a rapid transmission of motion in said one direction through said high speed drive while a change in the sensed condition in an opposite sense may cause said motor to effect a relatively slow transmission of motion in said opposite direction through said low speed drive.

2. The combination defined by claim 1 in which the condition sensing devices include a plurality of thermocouple devices for providing electrical signals selectively connected into the control system by the operation of said commutator, and the follow-up device includes a voltage dividing potentiometer, means operatively connected to the common output of the high and low speed drives for causing said potentiometer to apply a voltage to the control system acting in opposition to the electrical signals selectively connected into the control system by the commutator and in a sense tending to nullify the selected electrical signals, the reversible motor driving through the high speed drive in one direction only and upon the selected thermocouple device providing electrical signals to the control system in response to a change in temperature in one sense, and the said motor driving through the low speed drive in an opposite direction upon the selected thermocouple device providing electrical signals to the control system in response to a change in temperature in an opposite sense.

3. A condition sensing device comprising a plurality of condition sensors, motor means for operatively positioning an output shaft, a control system for the motor means, means for selectively connecting the condition sensors in the control system, a first motion transmitting means and a second motion transmitting means connected in parallel to the first motion transmitting means, the first motion transmitting means being effective to connect the motor means to the output shaft at a relatively high speed ratio and in only one sense of operation, and the second motion transmitting means being operable to connect the motor means to the output shaft at a relatively low speed ratio and in an opposite sense of operation.

4. A condition sensing control means comprising a condition sensing device, motor means controlled by the condition sensing device, means adjustably positioned by the motor means, including means providing a faster response upon the sensed condition acting in a predetermined sense than to the sensed condition acting in an opposite sense including a follow-up device for opposing the controlling action on the motor means of the condition sensing device, said follow-up device being adjustably positioned by the motor means and operated thereby with a faster response upon the sensed condition acting in the predetermined sense than to the sensed condition acting in an opposite sense.

5. A method of controlling a temperature indicator comprising the steps of selectively sensing a plurality of temperature conditions, adjusting the temperature indicator at a relatively rapid rate in an increase temperature indicating direction upon an increase in the selected sensed temperature, and adjusting the temperature indicator at a relatively slow rate in a decrease temperature indicating direction upon a decrease in the selected sensed temperature.

6. A temperature indicating means comprising a plurality of thermocouple devices for providing electrical signals proportional to sensed temperature conditions, an electrical control system including a commutator for selectively connecting said electrical signals into said control system and a follow-up device including a voltage dividing potentiometer operatively connected in said electrical control system, a reversible motor controlled by said system, a high speed drive and a low speed drive operatively connected in parallel and driven by said motor, said high speed drive and said low speed drive having a common output shaft operatively connected to the potentiometer for adjusting said potentiometer so as to apply a voltage acting in a sense tending to nullify the selected electrical signals, means for indicating the sensed temperature operatively positioned by the output shaft, said motor driving the common output shaft and indicator means through the high speed drive only in a direction for indicating an increase in the sensed temperature, and said motor driving the common output shaft and indicator means through the low speed drive only in a direction for indicating a decrease in the sensed temperature.

References Cited by the Examiner
UNITED STATES PATENTS

| | | | |
|---|---|---|---|
| 2,079,497 | 5/1937 | Wilhjelm | 236—15 |
| 3,103,122 | 9/1963 | Reichelt | 74—810 |

LOUIS R. PRINCE, *Primary Examiner.*

C. CARTER ELLS, *Assistant Examiner.*